United States Patent
Jeong et al.

(10) Patent No.: US 6,854,858 B2
(45) Date of Patent: Feb. 15, 2005

(54) LIQUID CRYSTAL DISPLAY MODULE WITH AN ENHANCED LIGHT GUIDE DEVICE

(75) Inventors: Seung-Chul Jeong, Seoul (KR); Sang-Duk Lee, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/445,848

(22) Filed: May 28, 2003

(65) Prior Publication Data

US 2003/0198039 A1 Oct. 23, 2003

Related U.S. Application Data

(63) Continuation of application No. 09/953,200, filed on Sep. 17, 2001, now Pat. No. 6,595,651.

(30) Foreign Application Priority Data

Nov. 22, 2000 (KR) .......................................... 2000-69479

(51) Int. Cl.[7] .............................................. F21V 8/00
(52) U.S. Cl. ......................................... 362/31; 362/561
(58) Field of Search .......................... 362/31, 362, 561, 362/551

(56) References Cited

U.S. PATENT DOCUMENTS

| | | |
|---|---|---|
| 2,994,971 A | 8/1961 | Meisenheimer et al. ...... 362/26 |
| 3,561,145 A | 2/1971 | Shotwell ....................... 362/26 |
| 3,864,905 A | 2/1975 | Richardson ................... 362/26 |
| 4,975,808 A | 12/1990 | Bond et al. .................... 362/31 |
| 5,949,505 A | 9/1999 | Funamoto et al. ............. 349/65 |
| 6,108,060 A | 8/2000 | Funamoto et al. ............. 349/65 |
| 6,139,163 A | 10/2000 | Satoh et al. ................... 362/31 |
| 6,295,405 B1 | 9/2001 | Johnson et al. ............. 385/146 |
| 2002/0044438 A1 | 4/2002 | Ono et al. ..................... 362/31 |
| 2002/0057562 A1 | 5/2002 | Sasako et al. ................ 362/31 |

*Primary Examiner*—Laura K. Tso
(74) *Attorney, Agent, or Firm*—McGuireWoods LLP

(57) ABSTRACT

A light guide device and a liquid crystal display module and a liquid crystal display device having the light-guide device that can minimize the flowing of a light guide plate received in a mold frame by improving the structure of the light guide plate of the liquid crystal display device. A light guide device for receiving a light from a lamp unit and guiding the light to a display unit for displaying an image has a catching jaw is formed by cutting off both corner portion of a first end portion to which the light from the lamp unit is inputted. The width of the first end portion including the catching jaw is wider than the width of a second end portion opposite to the first end portion. Therefore, the catching amount of a catching boss integrally formed with the mold frame and the catching jaw of the light guide plate is remarkably increased and the light guide plate is prevented from being flowed towards the lamp even when exterior impacts are applied to the liquid crystal display device.

17 Claims, 14 Drawing Sheets

LIQUID CRYSTAL DISPLAY MODULE WITH AN ENHANCED LIGHT GUIDE DEVICE

CROSS REFERENCE TO RELATED APPLICATIONS

This application is a continuation of Applicants' U.S. application Ser. No. 09/953,200 filed on Sep. 17, 2001 now U.S. Pat. No. 6,595,651.

BACKGROUND OF THE INVENTION

1. Field of the Invention

The present invention relates to a liquid crystal display device, and more particularly to a light guide device, and a liquid crystal display module and a liquid crystal display device having the light guide device, which can minimize the flowing of a light guide plate received in a mold frame by improving the structure of the light guide plate of the liquid crystal display device.

2. Description of the Related Art

Recently, an information processing device has been developed to have a various shape, a various function, and a rapid information processing speed. The information processed in the information processing device has an electrical signal. In order to confirm the information processed in the information processing device with the naked eye, a display device that is needed.

Recently, a liquid crystal display device which is lighter, and smaller than a CRT type display device has been developed. The liquid crystal display device now displays a full color spectrum in a high resolution. As a result, the liquid crystal display device is widely used as a computer monitor, a television receiver, and another display device.

The liquid crystal display device applies a voltage to a liquid crystal layer to change the molecular arrangement of the liquid crystal layer. The liquid crystal display device changes of optical properties in the liquid crystal and uses the modulation of a light by using a liquid crystal cell.

There are two kinds of liquid crystal display devices: TN (Twisted Nematic) method; and an STN (Super-Twisted Nematic) method. Also they can be grouped to an active matrix display method that uses a switching device and a TN liquid crystal, and a passive matrix display method which uses a STN liquid crystal according to the driving type.

The active matrix display method is used in a TFT-LCD and drives an LCD by using a TFT as a switch. The passive matrix display method does not use any transistor and does not need a complex circuit.

Further, liquid crystal display devices are grouped to a transmissive liquid crystal display device that uses a backlight and a reflecting liquid crystal display device that uses an exterior light source, according to a method for using a light source The transmissive liquid crystal display device using the back light as a light source is relatively heavy and voluminous due to the back light, but is widely used since it does not use an exterior light source and displays independently.

FIG. 1 is an exploded perspective view schematically showing a conventional liquid crystal display device. FIG. 2 is a partial exploded perspective view of the liquid crystal display device shown in FIG. 1.

Referring to FIG. 1, the liquid crystal display device 900 has a liquid crystal display module 700 to which an image signals is applied to display the screen, and a front surface case 810 and a rear surface case 820 for receiving the liquid crystal display module 700.

The liquid crystal display module 700 has a display unit 710 which includes a liquid crystal display panel for displaying the screen.

The display unit 710 has a liquid crystal display panel 710, an integrated printed circuit board 714, a data side tape carrier package 716, and a gate side flexible circuit board 718 manufactured by the COF method.

The liquid crystal display panel 712 has a thin film transistor substrate 712a, a color filter substrate 712b, and a liquid crystal layer interposed therebetween (not shown).

The thin film transistor substrate 712a is a transparent glass substrate on which thin film transistors are formed in a matrix shape. Data lines are connected to source terminals of the thin film transistors, and gate lines are connected to gate terminals of the thin film transistors. Pixel electrodes of indium tin oxide (ITO), which is a transparent conductive material, are formed on drain terminals.

If electrical signals are inputted to the data lines and the gate lines, the electrical signals are inputted to the source terminals and the gate terminals of thin film transistors and the thin film transistors are turned on or off so that electrical signals for forming pixels are outputted to the drain terminals.

The color filter substrate 712b is attached to the thin film transistor substrate 712a. RGB pixels that pass light through to realize color display is formed on the color filter substrate 712b by a thin film process. A common electrode comprised of ITO is coated on the front surface of the color filter board 712b.

If power sources are applied to the gate terminals and the source terminals of the transistors and the thin film transistors are turned on, an electric field is formed between the pixel electrode on the thin film transistor substrate and the common electrode on the color filter substrate. The arrangement angles of the liquid crystals injected between the thin film transistor board 712a and the color filter board 714b changes by the electric field, and the light passage changes due to the arrangement angle changes to obtain a desired pixel status.

A driving signal and a timing signal is applied to the gate line and the data line of the thin film transistor to control the arrangement of the liquid crystal of the liquid crystal display panel 712 and the timing when the liquid crystal is arranged. The data side tape carrier package 716 which is a kind of flexible circuit board determining the timing when the data driving signal is applied is attached to the source side of the liquid crystal display panel 712, and the gate side flexible circuit board 718 manufactured by the COF method for determining the time at which the gate driving signal is applied is attached to the gate side of the liquid crystal display panel 712.

The integrated printed circuit board 714 for receiving image signals from outside of the liquid crystal display panel 712 and applying driving signal to the gate line and the data line is connected to the data tape carrier package 714 of the data line side of the liquid crystal display panel 712. The integrated printed circuit board 714 has a source portion to which the image signals generated in an exterior information processing device (not shown) such as a computer are applied to provided the data driving signals to the liquid crystal display panel 712 and a gate portion for providing the gate driving signals to the gate line of the liquid crystal display panel 712. Namely, the integrated printed circuit board 714 generates the gate driving signals for driving the liquid crystal display device, the data signals, and a plurality of timing signals for applying the signals. The gate signals are applied to the gate line of the liquid crystal display panel 712 through the gate side flexible circuit board 718, and the data signals are applied to the data line of the liquid crystal display panel 212 through the data tape carrier package 716.

A back light assembly 720 for providing a uniform light to the display unit 710 is provided under the display unit 710. The back light assembly 720 comprises a lamp 722 which is provided on one side of the liquid crystal display module 700 to generate the light. The lamp 721 is protected by a lamp cover 722. A light guide plate 724 has a size corresponding to the liquid crystal display panel 712 of the display unit 710, and is located under the liquid crystal display panel 712. The lamp side of the light guide plate 724 is thicker than the other side, and guides the light generated in the lamp 722 towards the display unit 710 to change the passage of the light.

A plurality of optical sheets 726 for making the luminance of the light irradiated from the light guide plate 724 and passed towards the liquid crystal display panel 712 uniform are provided above the light guide plate 724. A reflection plate 728 for reflecting the light leaking from the light guide plate 724 to increase the light efficiency is provided under the light guide plate 724.

The display unit 710 and the back light assembly 720 is fixed and supported by a mold frame 730 that is a receiving receptacle. The mold frame 730 has a box-shape, and the upper surface of the mold frame 730 is open. Namely, the mold frame 730 has four side walls and a bottom, and openings for bending the integrated printed circuit board 714 along the outer side surface of the mold frame 730 and positioning the integrated printed circuit board 714 are formed on the lower surface of the bottom.

A chassis 740 for bending the integrated printed circuit board 714 of the display unit 710 and the gate tape carrier package 718 outside of the mold frame 730 and fixing the integrated printed circuit board 714 of the display unit 710 and the gate tape carrier package 718 to the bottom surface of the mold frame 730 to prevent the deviation of the display unit is provided. The chassis 740 has a box-shape. The upper surface of the chassis 740 is opened to expose the liquid crystal display panel 710, and the side walls are bent inwardly to cover the upper surface peripheral portion of the liquid crystal display panel 710.

On the other hand, referring to FIG. 2, first and second catching bosses 731 and 732 integrally formed with the mold frame 730 are formed on the corner portion of the side wall of the side on which the lamp 721 is installed in the receiving space of the mold frame 730. The lamp side corner of the light guide plate 724 received in the mold frame 730 is cut off to form first and second catching jaw 724a and 724b.

FIG. 3 shows the state in which the light guide plate shown in FIG. 2 is received in the mold frame. FIG. 4 is a partially enlarged view for showing the fixing structure of the light guide plate shown in FIG. 3 and the mold frame. FIG. 5 is a top view for showing the size of the light guide plate shown in FIG. 3.

Referring to FIG. 3, if the light guide plate 724 is received in the mold frame 730, the first and second catching jaws 724a and 724b are engaged with the first and second catching bosses 731 and 732. Therefore, even when exterior impacts are applied to the liquid crystal display device 900, the light guide plate 724 is does not move to the lamp side due to the first and second catching bosses 731 and 732.

However, recently, the side wall of the mold frame 730 is getting thinner to minimize the size of the liquid crystal display device 900. Further, as shown in FIG. 5, the width of the light guide plate 724 of the end portion of the side of the lamp 721 is identical to the width of the end portion of the opposite end portion. Therefore, it is not easy to sufficiently guarantee the thickness of the first and second catching bosses 731 and 732 which are integrally formed with the mold frame 730. Therefore, as shown in FIG. 4, the catching amount of the first and second catching jaws 724a and 724b of the light guide plate 724 and the first and second catching bosses 731 and 732 of the mold frame 730 can not be sufficiently guaranteed, making it difficult to prevent the light guide plate 724 from moving to the side of the lamp 721.

On the other hand, if the width of the light guide plate 724 is increased by the gap between the light guide plate 724 and the mold frame 730 to guarantee the catching amount, the catching amount of the first and second catching jaws 724a and 724b and the first and second catching bosses 731 and 732 can be obtained. However, without the gap between the light guide plate 724 and the mold frame 730, the thermal expansion space of the light guide plate 724 according to the temperature change and the humidity cannot be guaranteed, deteriorating the folding phenomenon. Especially, in the wedge type light guide plate 724 shown in FIG. 1, since the thermal expansion rate is large at a portion the light guide plate 724 is thin, the gap between the light guide plate 724 and the mold frame 730 needs to be sufficient.

On the other hand, even if it is not shown, the flowing of the light guide plate 724 can be prevented by protruding a portion of both side surfaces of the light guide plate 724, forming a boss, and forming a recess at a position which corresponds to the boss on both side wall of the mold frame 730. However, in the case, it is not easy to guarantee the catching amount between the boss and the recess and the light inputted from the lamp is concentrated at a corner portion bent by the boss and the recess.

SUMMARY OF THE INVENTION

The present invention has been made to solve the above-mentioned problem, and accordingly it is an object of the present invention to provide a light guide device that can minimize the moving of a light guide plate received in a mold frame by improving the structure of the light guide plate.

It is another object of the present invention to provide a liquid crystal display module having a light guide device that can minimize the moving of a light guide plate received in a mold frame by improving the structure of the light guide plate.

It is another object of the present invention to provide a liquid crystal display device having a light guide device that can minimize the moving of a light guide plate received in a mold frame by improving the structure of the light guide plate.

The light guide device according to the present invention receives a light generated from a lamp unit and guiding the light to a display unit for displaying an image. A catching jaw is formed by cutting off both corner portions of a first end portion of the light guide device to which the light is inputted from the lamp unit and the width of the first end portion including the catching jaw is wider than the width of a second portion opposite to the first end portion.

The liquid crystal display module according to the present invention comprises a lamp unit for generating a light, a light guide plate for guiding the light from the lamp unit to a display unit for displaying an image, in which a catching jaw is formed by cutting off both corner portions of a first end portion to which the light from the lamp unit is inputted and the width of the first end portion including the catching jaw is wider than the width of a second end portion opposite to the first end portion, and a mold frame for receiving the lamp unit and the light guide plate, in which a catching boss engaged with the catching jaw formed on both corner portions of the first end portion of the light guide plate for fixing the light guide plate is formed at a position that corresponds to the catching jaw of a bottom surface of the mold frame.

The liquid crystal display device according to the present invention comprises a back light assembly having a lamp unit for generating a light and a light guide plate for guiding the light from the lamp unit to a display unit for displaying an image, in which a catching jaw is formed by cutting off both corner portions of a first end portion to which the light from the lamp unit is inputted and the width of the first end portion including the catching jaw is wider than the width of a second end portion opposite to the first end portion, a mold frame for receiving the lamp unit and the light guide plate, in which a catching boss engaged with the catching jaw formed on both corner portions of the first end portion of the light guide plate for fixing the light guide plate is formed at a position which corresponds to the catching jaw of a bottom surface of the mold frame, and a top chassis for guiding the position of the display unit and fixing the display unit and the back light assembly to the mold frame by engaging the top chassis with the mold frame so as to be opposite to each other.

The catching jaw of both corner portions of the first end portion is formed in a slope shape in which the width thereof is narrower on the side of the second end portion opposite to the first end portion.

The light guide device is a wedge type light guide plate in which the first end portion to which the light is inputted is thicker than the second end portion opposite to the first end portion.

According to the light guide device, the liquid crystal display module, and the liquid crystal display device according to the present invention, the catching amount of the catching boss integrally formed with the mold frame and the catching jaw of the light guide plate is remarkably increased between the lamp and the light guide plate. Therefore, the light guide plate is prevented from moving towards the lamp even when exterior impacts are applied to the liquid crystal device. Further, since the catching jaw is formed so as to have a slope shape, the concentration of the light inputted from the lamp is prevented.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE PREFERRED EMBODIMENT

Hereinafter, preferred embodiments of the present invention will be explained in detail with reference to the attached drawings.

Embodiment 1

Figure 1:
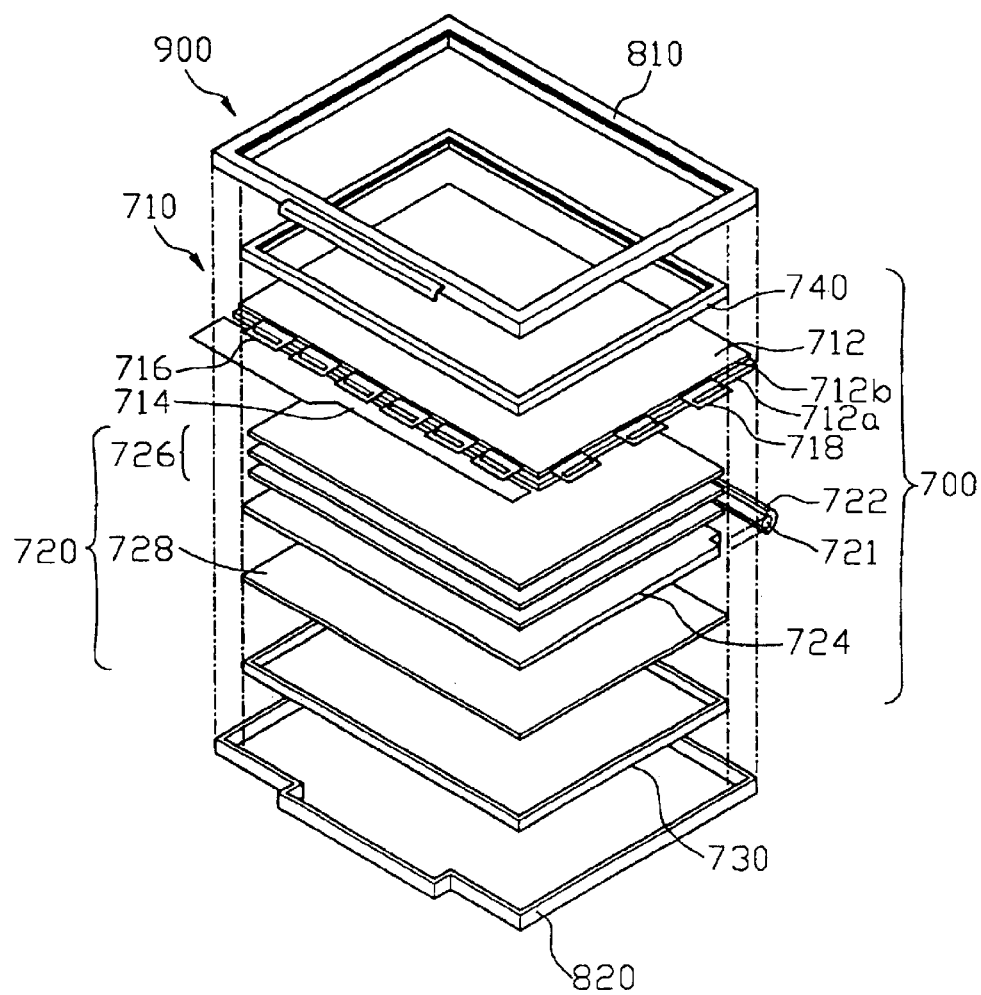
FIG. 1 is an exploded perspective view for schematically showing a conventional liquid crystal display device.
Figure 2:
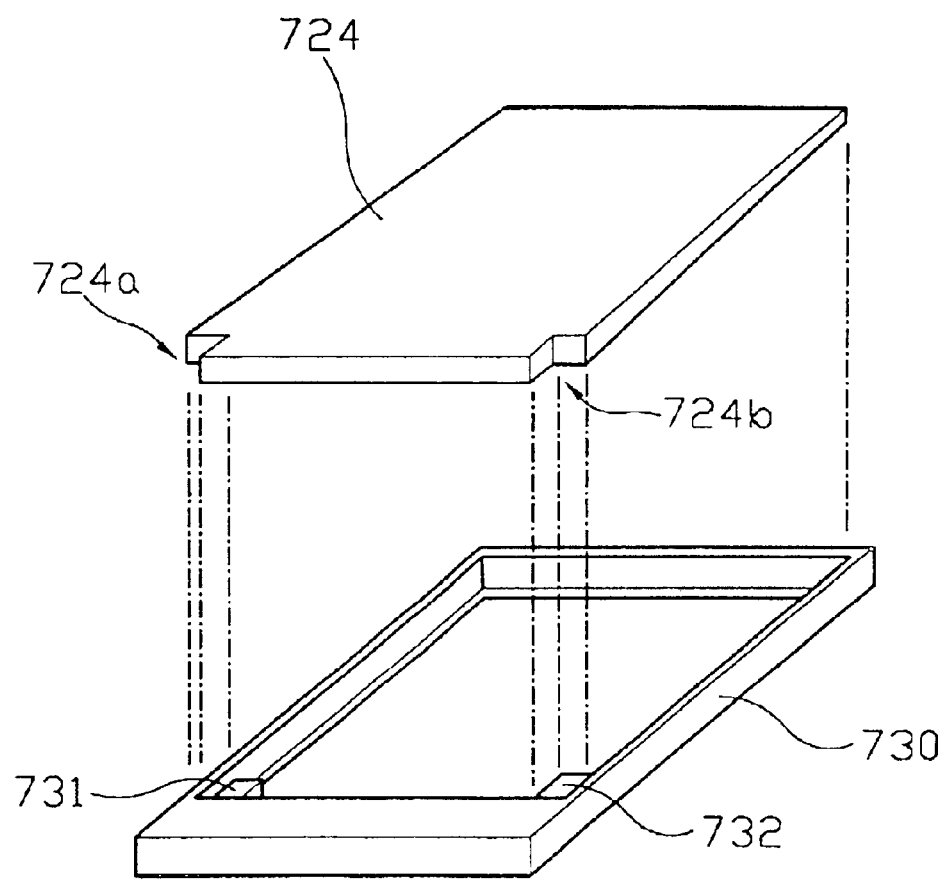
FIG. 2 is an exploded perspective view for showing the structure of a light guide plate and a mold frame shown in FIG. 1.
Figure 3:
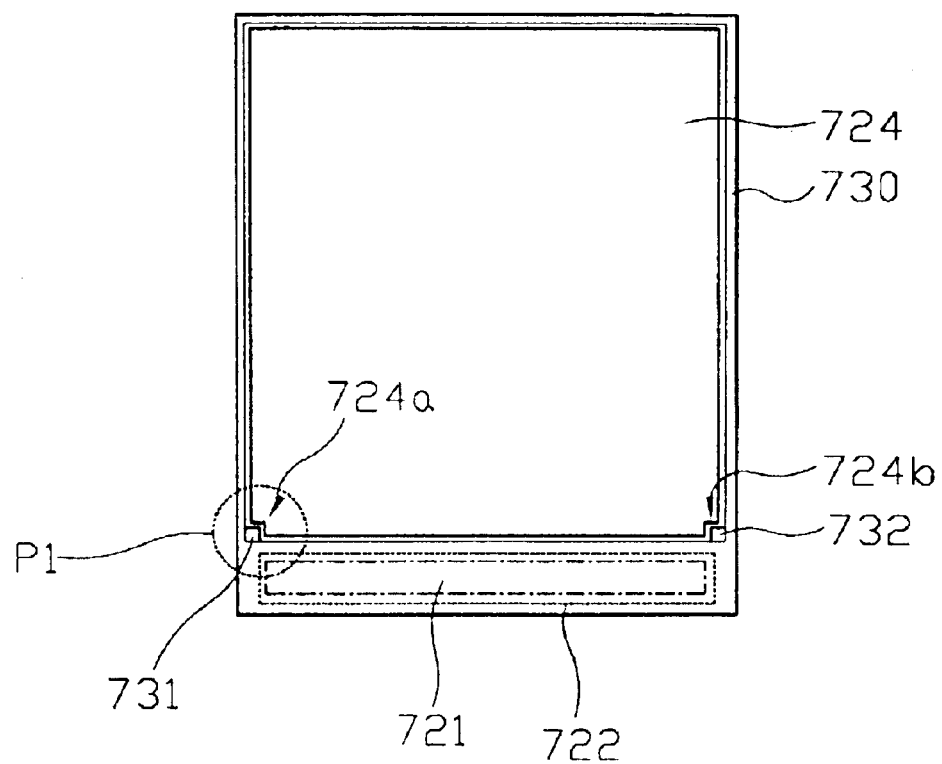
FIG. 3 is a view for showing the state in which the light guide plate shown in FIG. 2 is received in the mold frame.
Figure 4:
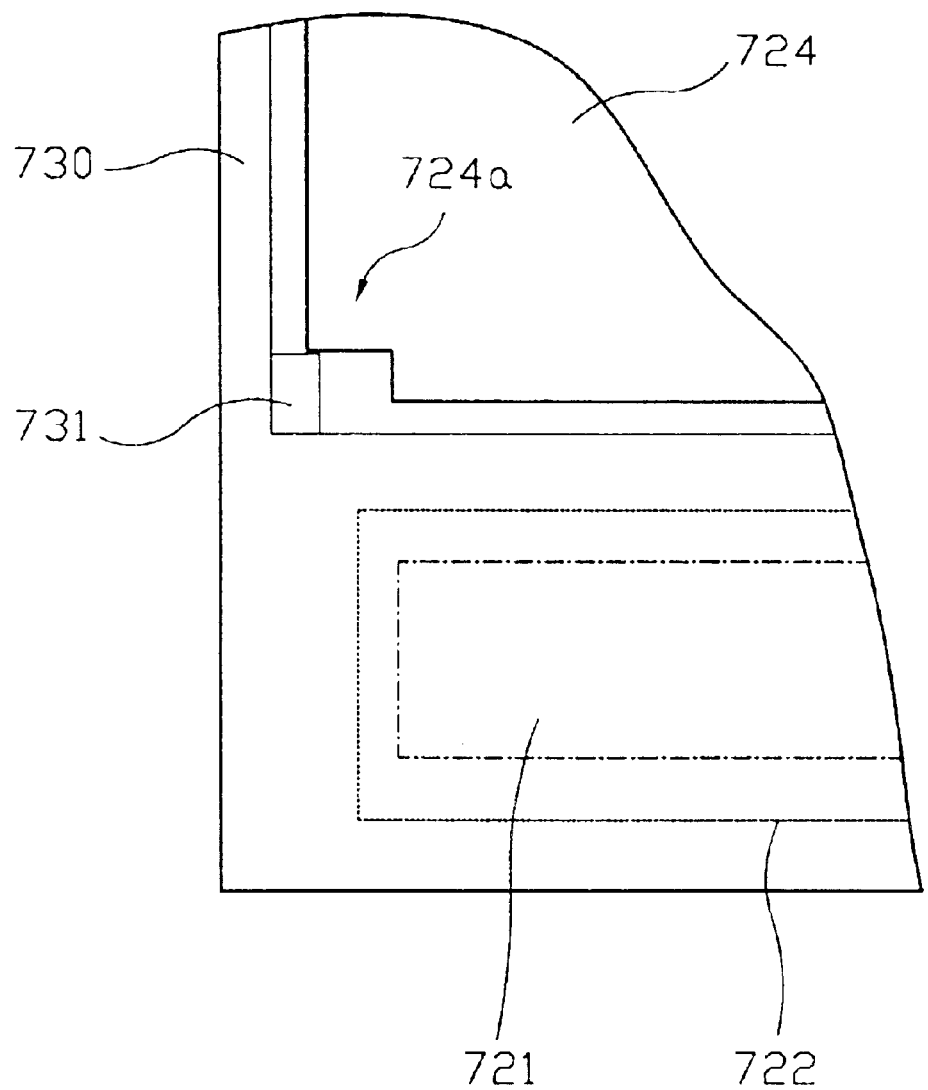
FIG. 4 is a partially enlarged view for showing the horizontal fixing structure of the light guide plate and the mold frame shown in FIG. 3.
Figure 5:
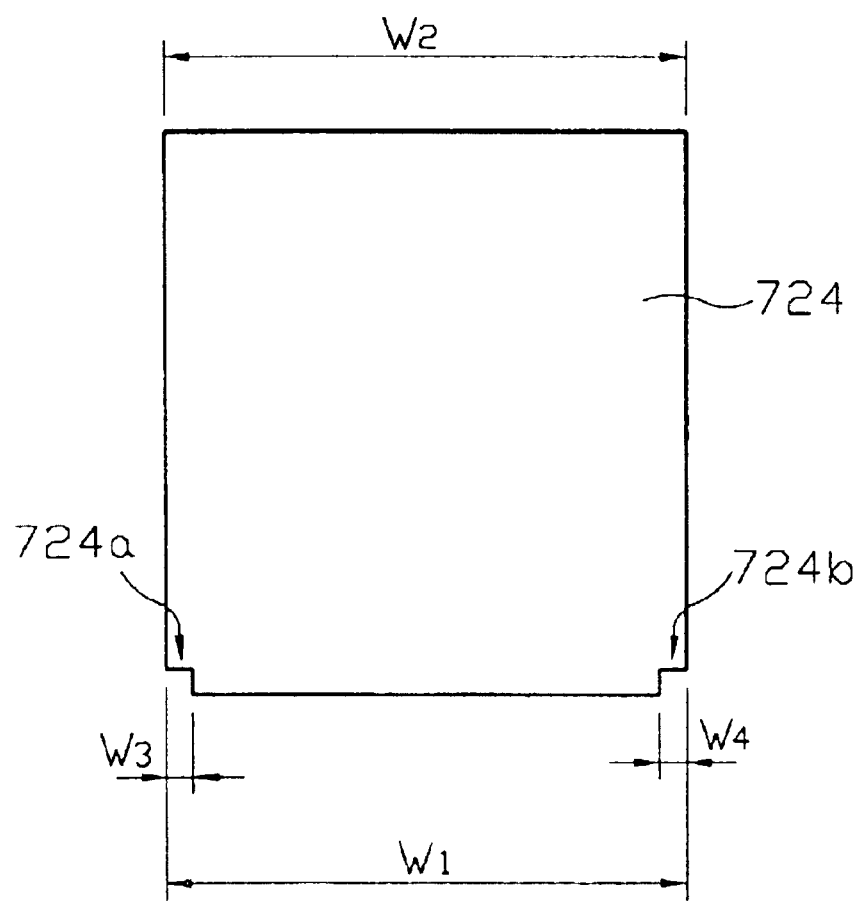
FIG. 5 is a top view for showing the size of the light guide plate shown in FIG. 3.
Figure 6:
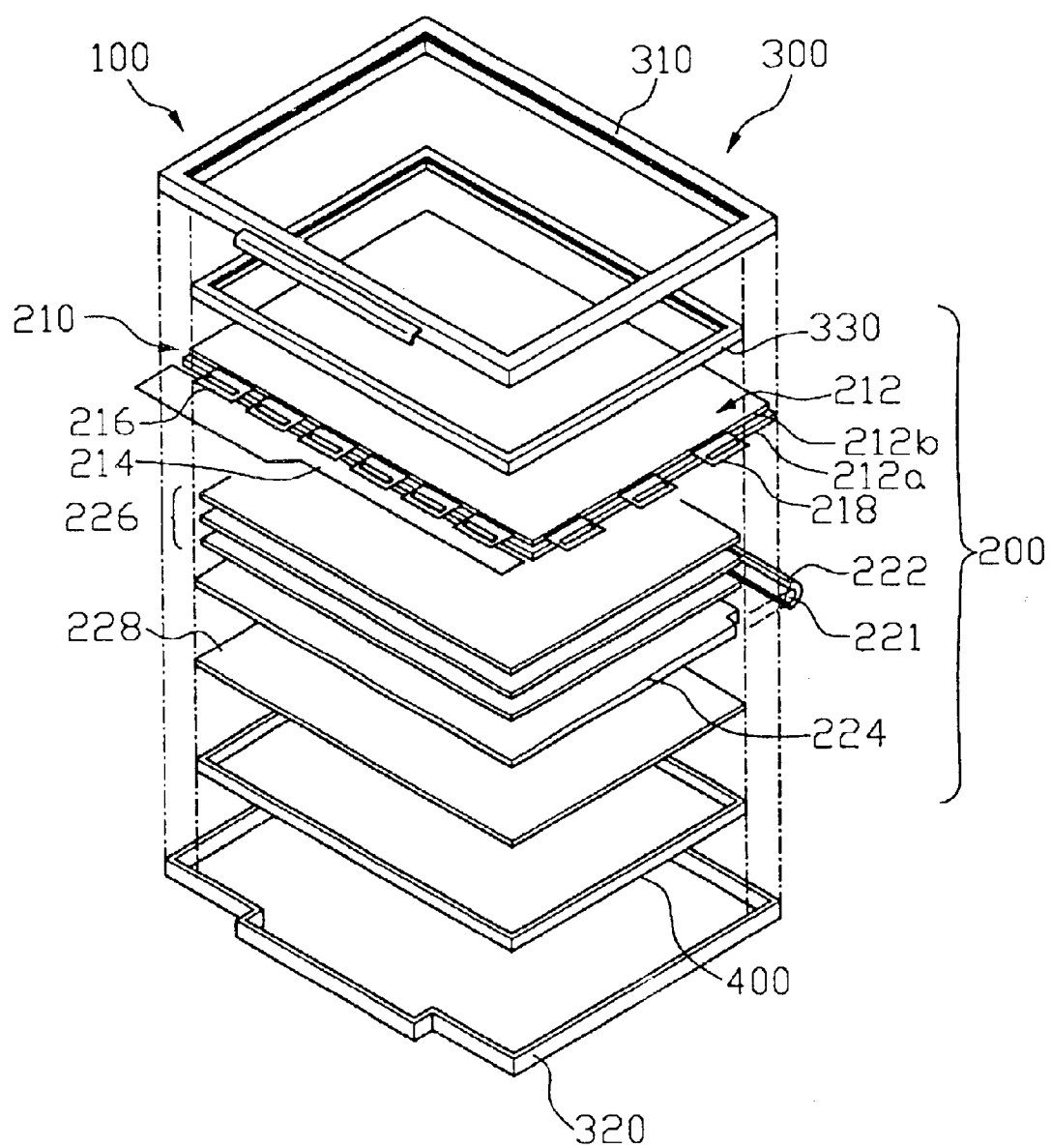
FIG. 6 is an exploded perspective view for showing a liquid crystal display device according to the first preferred embodiment of the present invention.

FIG. 6 is an exploded perspective view for schematically showing a liquid crystal display device according to a first preferred embodiment of the present invention.

Referring to FIG. 6, the liquid crystal display device 100 has a liquid crystal display module 200 to which an image signal is applied to display a screen and a case 300 which includes a front case 310 and a rear case 320 for receiving the liquid crystal display module 200.

The liquid crystal display module 200 has a display unit 210 having a liquid crystal display panel which displays the screen.

The display unit 210 has a liquid crystal display panel 212, a chasis 330 for being integrated with an integrated printed circuit board 214, a data side tape carrier package 216, and a gate side flexible circuit board 218 manufactured by the COF method.

The liquid crystal display panel 212 has a thin film transistor substrate 212a, a color filter substrate 212b, and a liquid crystal layer interposed therebetween (not shown).

The thin film transistor substrate 212a is a transparent glass substrate having a matrix type thin film transistor formed thereon. A data line is connected to a source terminal of the thin film transistors, and a gate line is connected to a gate terminal. A pixel electrode composed of indium tin oxide (ITO) is formed in a drain terminal.

If an electrical signal is inputted to the data line and the gate line, the electrical signal is inputted to the source terminal and the gate terminal of the thin film transistor. The thin film transistor is turned on or off as the gate signal is inputted, and an electrical signal needed to form a pixel image is outputted to the drain terminal.

The color filter substrate 212b is opposite to the thin film transistor substrate 212a. The color filter substrate 212b is a board on which RGB pixels are formed by a thin film process. A common electrode of ITO is coated on the front surface of the color filter substrate 212b.

If the thin film transistor is turned on by applying a power source to the gate terminal and the source terminal of the transistor of the thin film transistor substrate 212a, an electric field is formed between the pixel electrode and the common electrode of the color filter substrate. The arrangement of the liquid crystal injected between the thin film transistor substrate 212a and the color filter substrate 214b is changed by the electric field, and light transmission is changed accordingly.

In order to control the timing for the arrangement of the liquid crystal of the liquid crystal display panel 212, a driving signal and a timing signal are applied to the gate line and the data line of the thin film transistor.

As shown, the data tape carrier package 216, a flexible circuit board for determining the applying time of a data driving signal, is attached to the source side of the liquid crystal display panel 212, and the gate side flexible circuit board 218 manufactured by the COF method for determining the applying time of the driving signal of the gate is attached to the gate side.

The integrated printed circuit board 214 that receives the image signal from outside of the liquid crystal display panel 212 and applies a driving signal to the gate line and the data line is connected to the tape carrier package 214 of the data line side of the liquid crystal display panel 212.

A source portion that receives an image signal generated in an exterior information processing device (not shown) and provides a data driving signal to the liquid crystal display panel 212 and a gate portion for providing a gate driving signal to the gate line of the liquid crystal display panel 212 are formed in the integrated printed circuit board 214.

Namely, the integrated printed circuit board 214 generates the gate driving signal for driving the liquid crystal display device, the data signal, and a plurality of timing signals for applying the signals at a proper time. The gate driving signal is applied to the gate line of the liquid crystal display panel 212 through the gate side flexible circuit board 218, and the data signal is applied to the data line of the liquid crystal display panel 212 through the data tape carrier package 216.

A back light assembly 220 for providing the display unit 210 with a uniform light is provided under the display unit 210. The back light assembly 220 has a lamp 221 which is provided on one side of the liquid crystal display module 200 to generate a light, and the lamp 221 is protected by a lamp cover 222. A light guide plate 224 has a size corresponding to the liquid crystal panel 212 of the display unit 210, and guide the light generated in the lamp 221 towards the display unit 210 to change the path of the light.

A plurality of optical sheets 226 for making the luminance of the light which is irradiated from the light guide plate 224 and is moved towards the liquid crystal display panel 212 uniform are provided above the light guide plate 224. A reflection plate 228 that reflects the light leaking from the light guide plate 224 to increase the efficiency of the light is provided under the light guide plate 224. The display unit 210 and the back light assembly 220 is fixed by a mold frame 400 that is a receptacle assembly.

Figure 7:
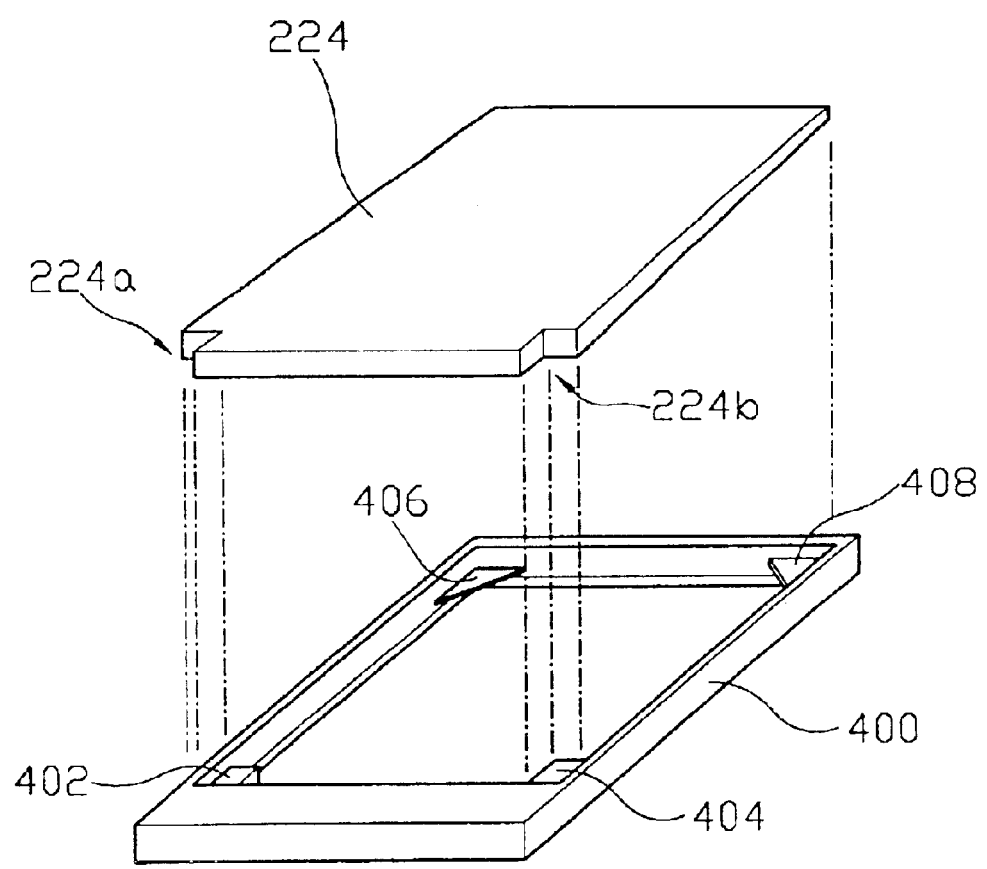
FIG. 7 is a perspective view for showing the structure of a light guide plate and a mold frame of the liquid crystal display device according to the first preferred embodiment of the present invention that are shown in FIG. 6.
Figure 8:
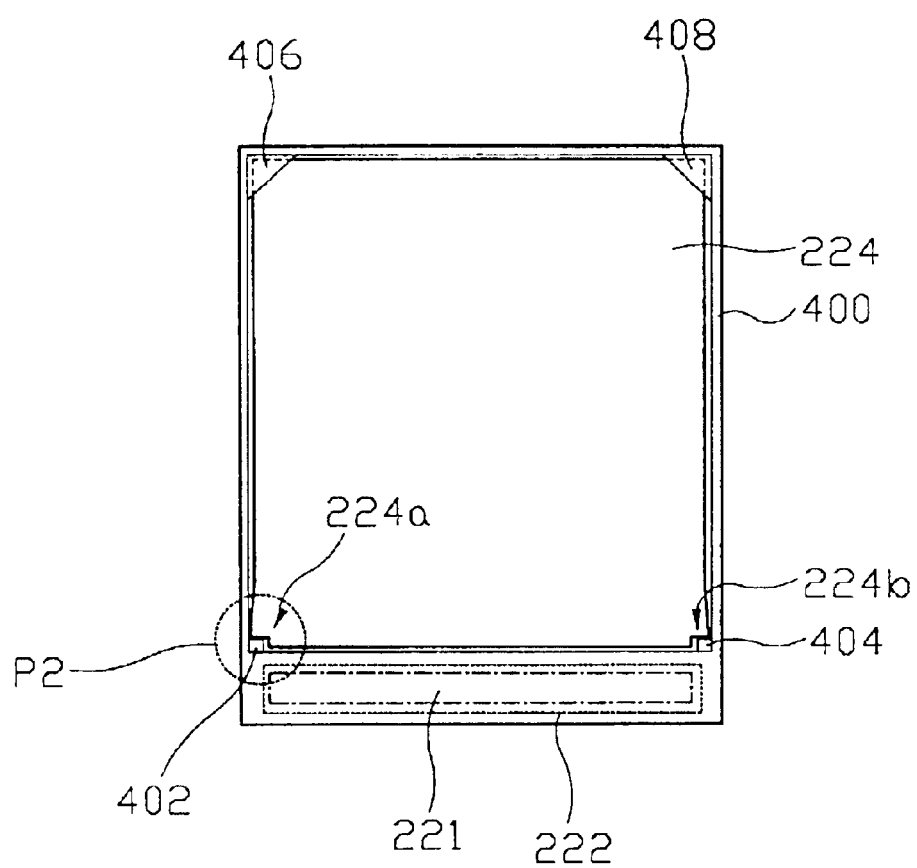
FIG. 8 is a view for showing the state in which the light guide plate according to the first preferred embodiment of the present invention shown in FIG. 7 is received in the mold frame.

FIG. 7 is an exploded perspective view showing the light guide plate and the mold frame of the liquid crystal display device according to the first preferred embodiment of the present invention shown in FIG. 6. FIG. 8 is a view showing the state in which the light guide plate according to the first preferred embodiment of the present invention shown in FIG. 7 is received in the mold frame.

Referring to FIG. 7, the light guide plate 224 is a wedge type light guide plate in which the thickness thereof becomes thinner as it goes far from the side close to the lamp 221. However, the first preferred embodiment according to the present invention is applied to the case where the thickness of the both end portions of the light guide plate 224 is identical.

A first end portion of the light guide plate, i.e., both edge portions of the first end portion which is received in a receiving space of the mold frame 400 towards a position at which the lamp 221 is installed is cut off to formed a third catching jaw 224a and a fourth catching jaw 224b. The overall width of the first end portion in which the third and fourth catching jaws 224a and 224b are formed is larger than the width of the second end portion opposite to the first end portion, i.e., the end portion of the far side of the lamp 221. It is because the catching body is integrally formed with the light guide plate 224 on the side wall of the third and fourth catching jaws 224a and 224b, and it will be explained in detail with reference to FIGS. 9 and 10.

The lamp 221 and the lamp cover 222 are received on one side of the receiving space of the mold frame 400 that receives the light guide plate 224. Third and fourth catching bosses 402 and 404 which are engaged with the third and fourth catching jaw 224a and 224b to prevent the flowing of the horizontal direction of the light guide plate 224 are integrally formed with the mold frame 400 in both corner portions of the side wall on which the lamp 221 is positioned. Third and fourth catching covers 406 and 408 for preventing the light guide plate 224 received in the mold frame 400 from being deviated to the vertical direction of the receiving space are integrally formed with the mold frame 400 in both corner portions of the side wall opposite to the third and fourth catching bosses 402 and 404.

As shown in FIG. 8, when the light guide plate 224 is received in the receiving space of the mold frame 400, the third catching jaw 224a is engaged with the third catching boss 402 and the fourth catching jaw 224b is engaged with the fourth catching boss 404. A portion of the both corner portions of the second end portion of the light guide plate 224 is inserted into the lower side of the third and fourth catching covers 406 and 408.

Figure 9:
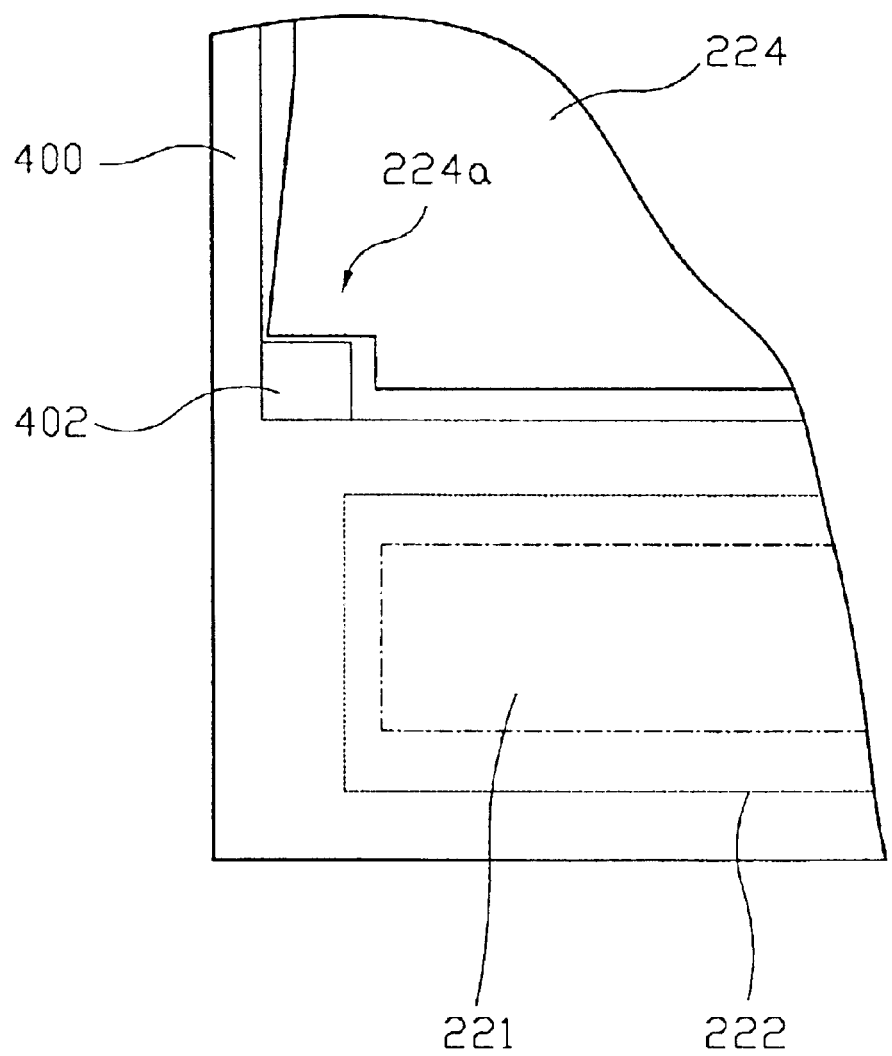
FIG. 9 is a partially enlarged view for showing the fixing structure of the light guide plate according to the first preferred embodiment of the present invention shown in FIG. 8 and the mold frame.
Figure 10:
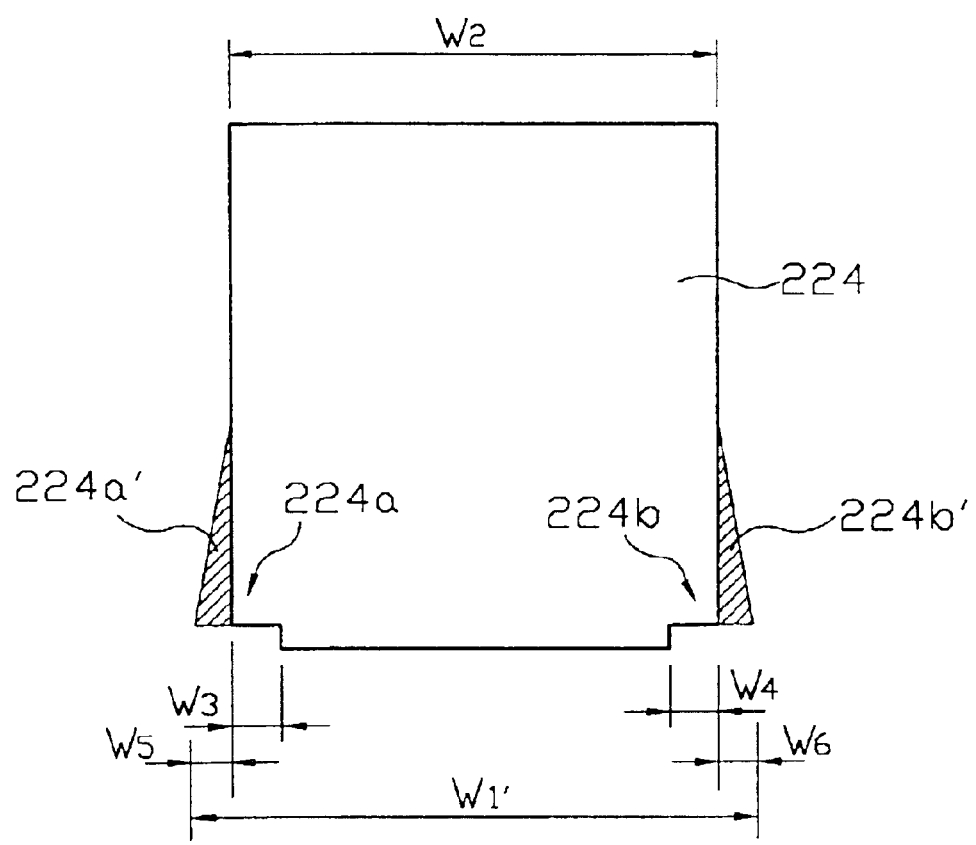
FIG. 10 is a top view for showing the structure of the light guide plate according to the first preferred embodiment of the present invention shown in FIG. 8.

FIG. 9 is a partial enlarged view for showing the fixing structure of the light guide plate and the mold frame according to the first preferred embodiment of the present invention shown in FIG. 8. FIG. 10 shows in detail the structure of the light guide plate according to the first preferred embodiment of the present invention shown in FIG. 8.

Referring to FIG. 9, the gap between the side surface of the third catching jaw 224a and the side wall of the mold frame 400 is narrower than the gap between the side surface of the second end portion of the light guide plate 224 and the mold frame 400. It is because the catching body is integrally formed with the light guide plate 224 on the side wall of the third catching jaw 224a. The catching body has a slope shape in which the width thereof is narrower as it proceeds towards the second end portion. The width of the third catching jaw 224a of the light guide plate 224 is narrower as it proceeds towards the first end portion to the second end portion. The catching body is formed in the fourth catching jaw 224b. Therefore, the catching amount between the third and fourth catching jaws 224a and 224b and the third and fourth catching bosses 402 and 404 is increased by the width of the catching body.

As shown in FIG. 10, the widths W3 and W4 of the third and fourth catching jaws 224a and 224b of the light guide plate 224 are identical before the catching bodies 224a' and 224b' are attached to the third and fourth catching jaws 224a and 224b. In the case, the widths of the first end portion and the second end portion are identical. However, if the catching bodies 224a' and 224b' are attached to the side wall of the third and fourth catching jaws 224a and 224b, the width W1' of the first end portion increases by the widths W5 and W6 of the catching bodies 224a' and 224b' in relation to the width W2 of the second end portion. Therefore, as shown in FIG. 9, the catching amount between the third and fourth catching jaws 224a and 224b and the third and fourth catching bosses 402 and 404 are sufficiently obtained, and thus the light guide plate 224 is prevented from being flowed towards the lamp 221 by the exterior impacts. Further, the catching bodies 224a' and 224b' has a slope shape in which the width thereof is narrower as it proceeds towards the second end portion, the concentration of the light irradiated from the lamp 221 is prevented. Since the gap between the light guide plate 224 and the side wall of the mold frame 400 except for the portion in which the catching bodies 224a' and 224b' are attached is sufficiently maintained, the folding of the light guide plate 224 according to the temperature and the humidity is prevented.

Embodiment 2

Hereinafter, a liquid crystal display device according to the second preferred embodiment of the present invention will be explained with reference to FIGS. 11, 12 and 13.

Figure 11:
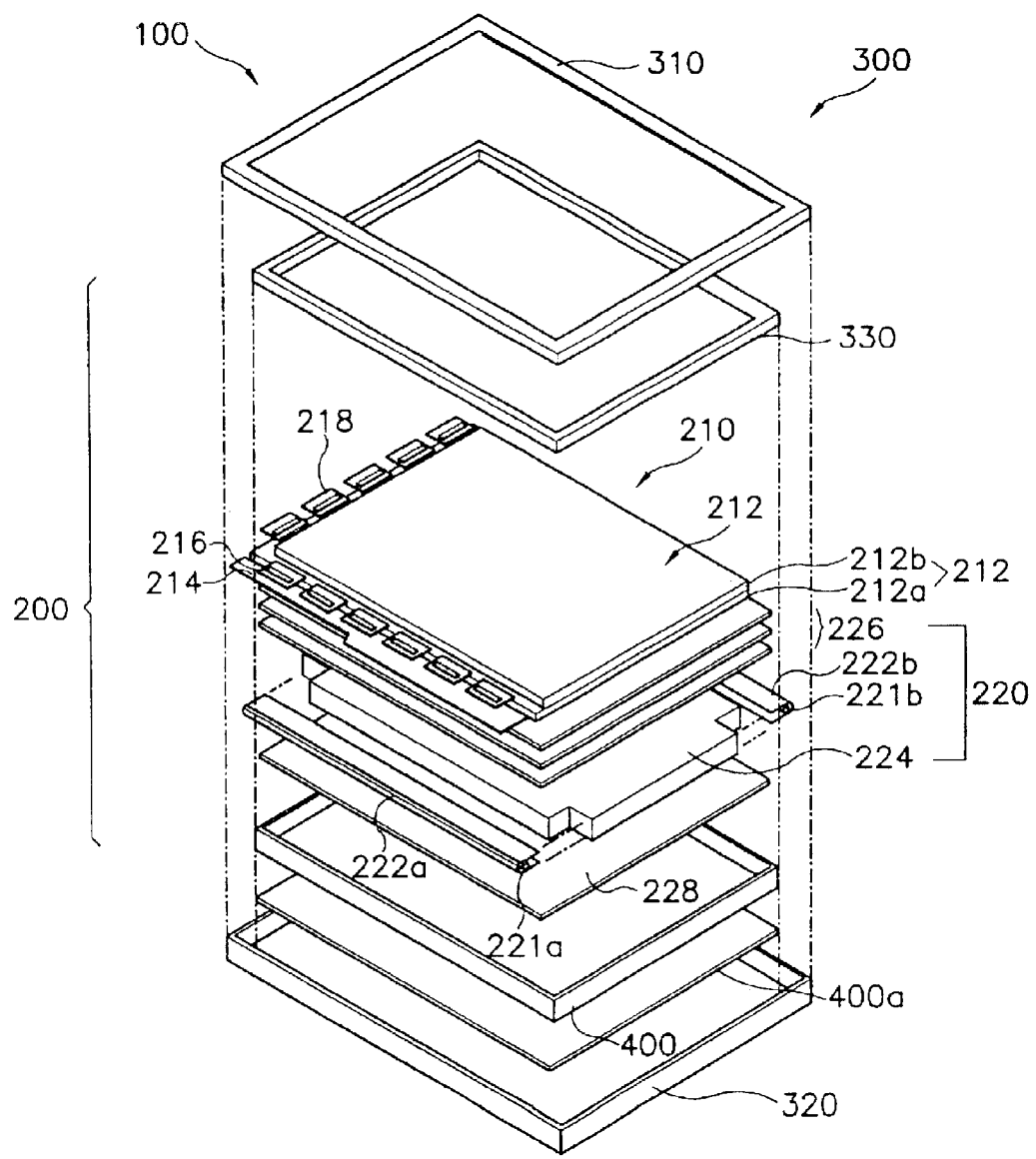
FIG. 11 is an exploded perspective view for showing a liquid crystal display device according to the second preferred embodiment of the present invention.

FIG. 11 is an exploded perspective view showing the liquid crystal display device according to the second preferred embodiment of the present invention.

Referring to FIG. 11, the liquid crystal display device according to the second preferred embodiment of the present invention has the same structure as the liquid crystal display device according to the first preferred embodiment of the present invention shown in FIG. 6 except for a back light assembly 220 and a back cover 400a. Namely, the liquid crystal display device according to the second preferred embodiment of the present invention shown in FIG. 11 has a monitor device which employs two lamps.

As shown in FIG. 11, a back light assembly 220 for providing the uniform light to the display unit 210 is provided under the display unit 210. The back light assembly 220 has first and second lamps 221a and 221b which are provided on both sides of the liquid crystal display module 220 to generate the light, and the first and second lamps 221a and 221b are protected by the first and second lamp covers 222a and 222b. The light guide plate 224 has a size which corresponds to the liquid crystal panel 212 of the display unit 210, and guides the light generated from the first and second lamps 221a and 221b towards the display unit 210 to change the path of the light. The light guide plate 224 can be a plurality of light guide plates, and can be a single light guide plate.

The display unit 210 and the back light assembly 220 are supported by the mold frame which is a receiving receptacle assembly. A back cover 400a made of metal for interrupting and reducing EMI generated in the monitor device is engaged with the rear surface of the mold frame 400.

Figure 12:
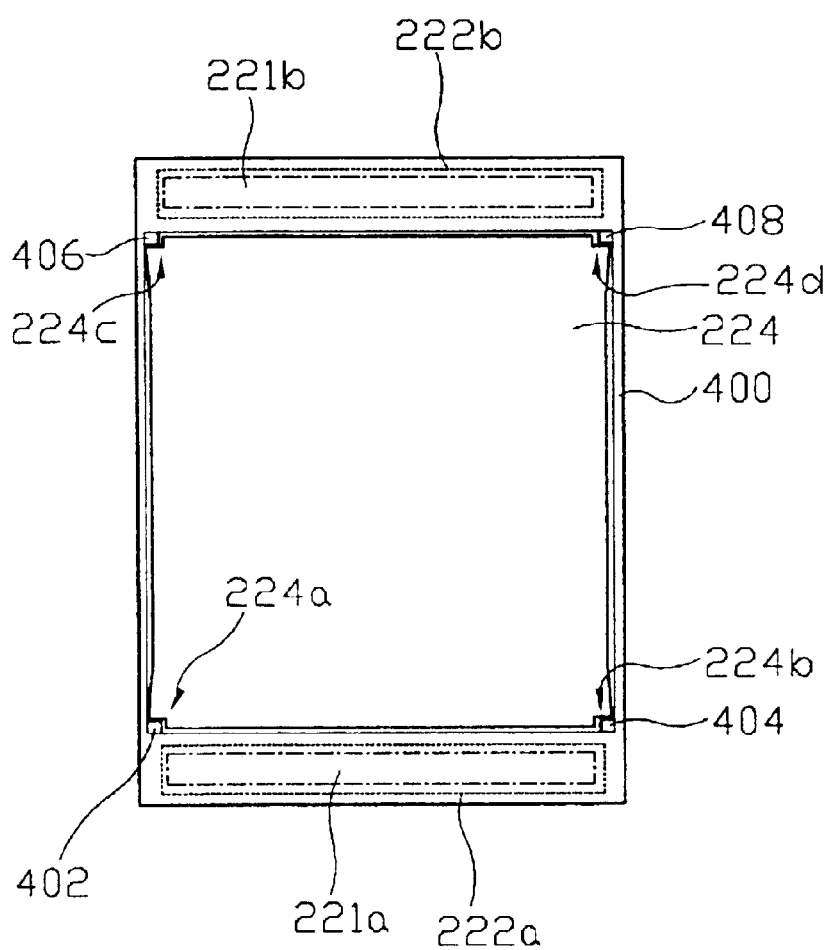
FIG. 12 is a view for showing the state in which the light guide plate according to the second preferred embodiment of the present invention shown in FIG. 11 is received in a mold frame.

FIG. 12 shows the state in which the light guide plate according to the second preferred embodiment of the present invention shown in FIG. 11 is received in the mold frame. FIG. 13 is a top view for showing the structure of the light guide plate according to the second preferred embodiment of the present invention shown in FIG. 10.

Referring to FIG. 12, the first end of the light guide plate 224, i.e., both corner portion of the first end portion which is opposite to the side wall in which the first lamp 221a is installed in the receiving space of the mold frame is cut off to form a fifth catching jaw 224a and a sixth catching jaw 224b. Further, the second end portion opposite to the first end portion of the light guide plate 224, i.e., both corner portions of the second end portion opposite to the side wall in which the second lamp 221b is installed in the receiving space of the mold frame 400 is cut off to form a seventh catching jaw 224c and an eighth catching jaw 224d.

The total width W1' of the first end portion in which the fifth and sixth catching jaws 224a and 224b are formed is identical to the width W2' of the second end portion in which the seventh and eighth catching jaws 224c and 224d are formed. The catching bodies 224a', 224b', 224c', and 224d' are integrally formed with the side surfaces of the fifth, sixth, seventh, and eighth catching jaws 224a, 224b, 224c, and 224d, and the overall width of the first and second end portions is wider than the width W7 of the central portion of the light guide plate 224. It will be explained in detail with reference to FIG. 13.

On the other hand, in the receiving space of the mold frame 400 which receives the light guide plate 224, the first lamp 221a and the first lamp cover 222a are received on the side opposite to the first end portion of the light guide plate 224 and the second lamp 221b and the second lamp cover 222b are received on the side opposite to the second end portion. Fifth and sixth catching bosses 402 and 404 which are engaged with the fifth and six catching jaws 224a and 224b to prevent the flowing of the light guide plate 224 towards the first lamp 221a are integrally formed with the mold frame 400 on both corner portions of the side wall in which the first lamp 221a is positioned. Seventh and eighth catching bosses 406 and 408 which are engaged with the seventh and eighth catching jaws 224c and 224d to prevent the flowing of the light guide plate 224 towards the second lamp 221b are integrally formed with the mold frame 400 on both corner portions of the side wall in which the second lamp 221b is positioned.

As shown in FIG. 12, if the light guide plate 224 is received in the receiving space of the mold frame 400, the fifth catching jaw 224a and the fifth catching boss 402, the six the catching jaw 224b and the sixth catching boss 404, the seventh catching jaw 224c and the seventh catching boss 406, and the eighth catching jaw 224d and the eighth catching boss 408 are respectively engaged to prevent the horizontal flowing of the light guide plate 224.

Referring to FIG. 12, the gap between the side surface of the fifth catching jaw 224a and the side wall of the mold frame 400 is narrower than the gap between the side surface of the central portion of the light guide plate 224 and the mold frame 400. It is because the catching body 224a' is integrally attached to the light guide plate 224 on the side wall of the fifth catching jaw 224a, and the catching body 224a' has a smooth slope in which the width W5 thereof is narrower at the central portion of the light guide plate. The catching body 224a' is identical in the sixth, seventh, and eighth catching jaws 224b, 224c, and 224d of the light guide plate 224. The catching amount between the fifth, sixth, seventh, and eighth catching jaws 224a, 224b, 224c, and 224d and the fifth, sixth, seventh, and eighth catching bosses 402, 404, 406, and 408 is respectively increased by the widths W5, W6, W5', and W6' of the catching bodies 224a', 224b', 224c', and 224d'.

Figure 13:
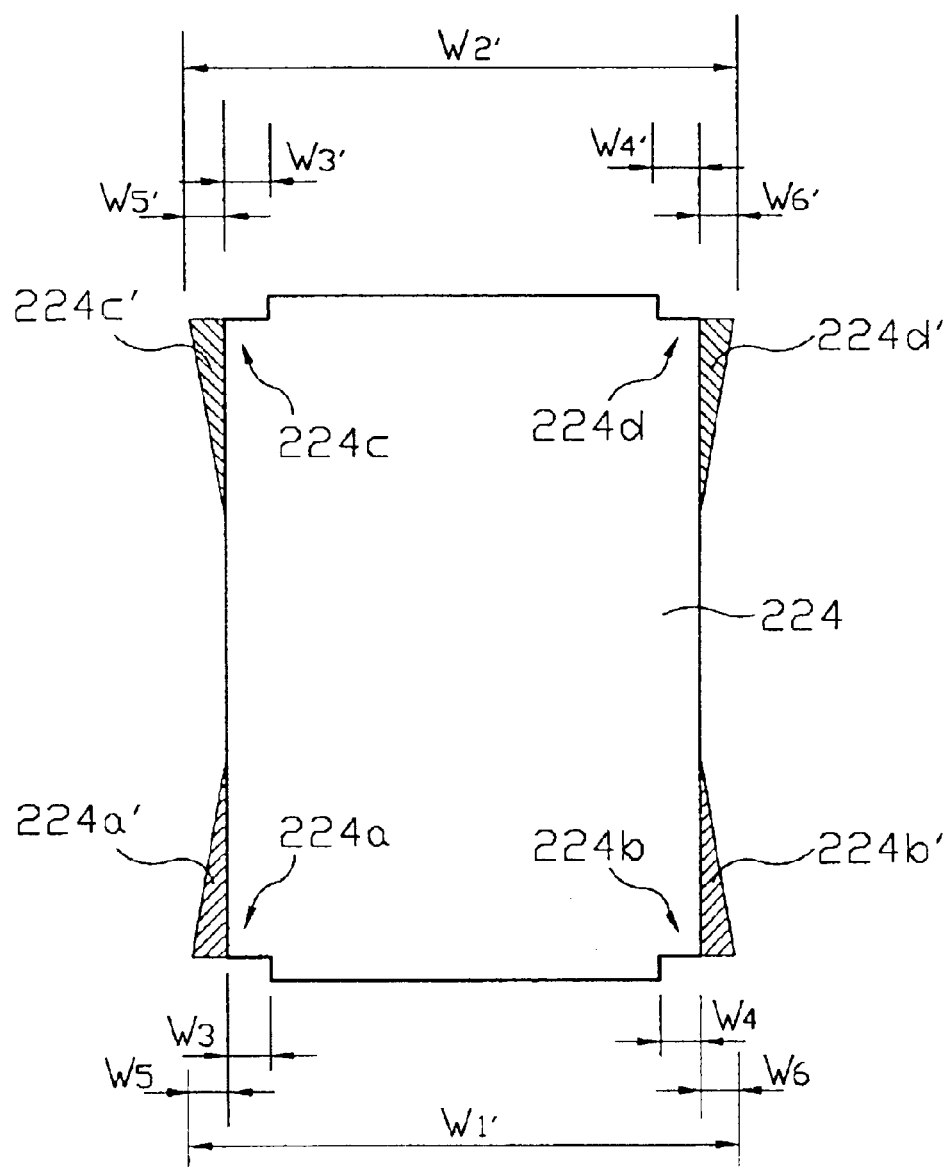
FIG. 13 is a top view for showing the structure of the light guide plate according to the second preferred embodiment of the present invention shown in FIG. 10.

As shown in FIG. 13, the widths W3, W4, W3', and W4' of the fifth, sixth, seventh, and eighth catching jaws 224a, 224b, 224c, and 224d are identical before the catching bodies 224a', 224b', 224c', and 224d' are attached to the fifth, sixth, seventh, and eights catching jaws 224a, 224b, 224c, and 224d. However, if the catching bodies 224a', 224b', 224c', and 224d' are attached to the side walls of the fifth, sixth, seventh, and eighth catching jaws 224a, 224b, 224c, 224d, the width W1' of the first end portion and the width W2' of the second end portion are wider than the width W7 of the central portion by the widths W5 and W6 of the catching bodies 224a' and 224b'. Therefore, as shown in FIG. 13, the catching amounts between the fifth, sixth, seventh, and eighth catching jaws 224a, 224b, 224c, and 224d and the fifth, sixth, seventh, and eighth catching bosses 402, 404, 406, and 408 are sufficiently obtained, and thus the light guide plate 224 is prevented from being flowed towards the first lamp 221a or the second lamp 221b by the exterior impacts. Further, since the catching bodies 224a', 224b', 224c', and 224d' has a slope shape in which the widths W5, W6, W5', and W6' are narrower towards the central portion, the light irradiated from the first and second lamps 221a and 221b is prevented from being concentrated.

Figure 14:
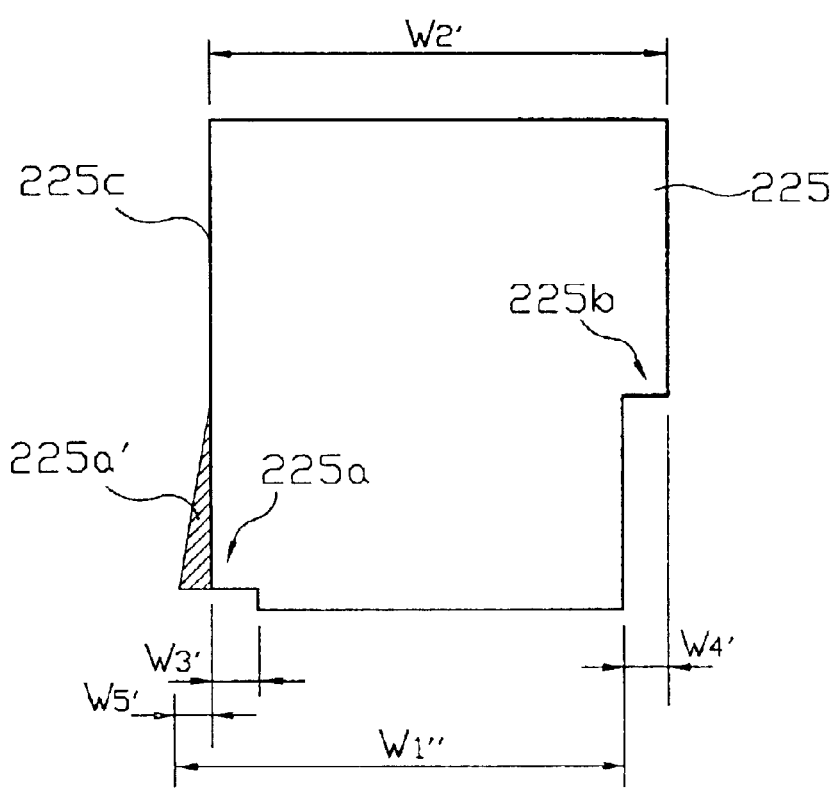
FIG. 14 is a top view showing another structure of the light guide plate according to the first preferred embodiment of the present invention shown FIG. 8.

On the other hand, as shown in FIG. 14, the above-mentioned catching body of the light guide plate 224 is also formed at one corner portion of an end portion of the light guide plate 225.

Referring to FIG. 14, a first end portion of the light guide plate 225, i.e., one corner portion of the first end portion which is received in a receiving space of the mold frame 400 toward a position at which the lamp 221 is installed is cut off to form a ninth catching jaw 225a shaping the same as the third catching jaw 224a. Another corner portion of the first end portion is also cut off to form a catching jaw as shown in FIG. 14 or is formed into a particular shape according to the developing environment of the liquid crystal display device. A catching body 225a' is formed on the side wall 225c of the corner portion at which the ninth catching jaw 225a is formed. The catching body 225a' is formed to elongate from the ninth catching jaw 225a and have a slope shape in which the width thereof is narrower at the central portion of the light guide plate 225. Additionally, a catching jaw 225b may be formed along a side wall portion of the light guide plate.

According to the light guide plate and the liquid crystal display module and a liquid crystal display device having the light guide plate, catching jaws are formed on both corner portions of the end portions opposite to the lamp installed in the mold frame among the side surface of the light guide plate, and the width of the end portion including the catching jaw is wider than the width of the end portion received towards a side on which the lamp is not installed. Further, the outer surface of the catching jaw formed in the both corner portions has a slope shape in which the width thereof is narrower as it proceeds towards the central portion.

Therefore, the catching amount of the catching bosses integrally formed with the mold frame and the catching jaws of the light guide plate is remarkably increased. Therefore, the light guide plate is prevented from being flowed towards the lamp even when the exterior impacts are applied to the liquid crystal display device. Further, since the catching jaw is formed in a slope shape, the light irradiated from the lamp is prevented from being concentrated.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display module, comprising:
   a light guide plate for guiding a light emitted from a lamp unit to a display unit; and
   a mold frame for receiving the light guide plate and the lamp unit, the mold frame having a catching cover formed at a corner portion of a sidewall of the mold frame so as to prevent the light guide plate from being deviated in a vertical direction from the mold frame, and a catching boss, engaged with a catching jaw formed on both corner portions of the light guide plate, for fixing the light guide plate to the mold frame.

2. The liquid crystal display module of claim 1, wherein the catching cover is disposed in both corner portions of the side wall opposite to the catching boss.

3. The liquid crystal display module of claim 1, wherein the catching cover is integrally formed with the mold frame.

4. The liquid crystal display module of claim 1, wherein both corner portions of the light guide plate are inserted into the catching cover.

5. The liquid crystal display module of claim 1, wherein the catching cover covers an upper surface of both corner portions of the light guide plate to prevent the light guide plate from being deviated in a vertical direction from the mold frame.

6. A liquid crystal display module, comprising:
   a light guide plate for guiding a light emitted from a lamp unit to a display unit; and
   a mold frame for receiving the light guide plate and the lamp unit, wherein the mold frame comprises a catching cover arranged on the mold frame to substantially prevent vertical movement of the light guide plate and a catching boss capable of receiving a catching jaw formed in the light guide plate to aid in securing the light guide plate to the mold frame.

7. The liquid crystal display module of claim 6, wherein the catching cover is formed in a corner portion of the mold frame.

8. The liquid crystal display module of claim 6, wherein the light guide plate further comprises a catching jaw formed along a sidewall of the light guide plate.

9. The liquid crystal display module of claim 8, wherein the mold frame further comprises a catching boss arranged along a sidewall of the mold frame for receiving the catching jaw formed along the sidewall of the light guide plate.

10. The liquid crystal display module of claim 6, wherein the light guide plate has a first end portion and a second end portion, the second end portion is narrower than the first end portion of the light guide plate.

11. The liquid crystal display module of claim 6, further comprising a catching body attached to the light guide plate to increase the width of the light guide plate.

12. The liquid crystal display module of claim 6, wherein the catching jaw is formed in a corner portion of the light guide plate.

13. A display module, comprising:

a light guide plate for receiving light from a lamp unit;

a mold frame for receiving the light guide plate and the lamp unit, wherein the mold frame comprises a catching cover to prevent the light guide plate from moving in a vertical direction, a catching boss engaged with a catching jaw formed in a corner portion of the light guide plate to substantially secure the light guide plate to the mold frame.

14. The display module of claim 13, wherein the light guide plate has a first end portion and a second end portion opposite the first end portion, the first end portion is wider than a central portion of the light guide plate.

15. The display module of claim 13, wherein the catching boss comprises a plurality of catching bosses formed at corner portions of the first end portion and the second end portion of the light guide plate.

16. The display module of claim 13, wherein the light guide plate has a first end portion and a second end portion opposite the first end portion, the first end portion and second end portion are wider than a central portion of the light guide plate.

17. The display module of claim 13, wherein the light guide plate further comprises a catching body formed along a sidewall of the light guide plate to increase a width of the light guide plate.

* * * * *